(12) United States Patent
Shinjo

(10) Patent No.: US 6,253,649 B1
(45) Date of Patent: Jul. 3, 2001

(54) SCREW WITH A RECESSED HEAD AND A DRIVER BIT ENGAGEABLE THEREWITH

(75) Inventor: Katsumi Shinjo, Osaka (JP)

(73) Assignee: Yugenkaisha Shinjo Seisakusho, Osaka (JP)

( * ) Notice: Subject to any disclaimer, the term of this patent is extended or adjusted under 35 U.S.C. 154(b) by 0 days.

(21) Appl. No.: 09/441,054

(22) Filed: Nov. 16, 1999

(30) Foreign Application Priority Data

Dec. 18, 1998 (JP) .................................................. 10-360591

(51) Int. Cl.[7] ...................................................... B25B 23/00
(52) U.S. Cl. .............................................. 81/460; 411/404
(58) Field of Search ....................... 81/460, 461; 411/403, 411/404

(56) References Cited

U.S. PATENT DOCUMENTS

| | | | | |
|---|---|---|---|---|
| 2,173,707 | * | 9/1939 | Brown .................................. | 411/403 |
| 2,397,216 | * | 3/1946 | Stellin .................................. | 411/404 |
| 4,084,478 | * | 4/1978 | Simmons ............................. | 411/404 |
| 4,089,357 | * | 5/1978 | Gill ...................................... | 145/50 A |
| 4,202,244 | * | 5/1980 | Gutshall .............................. | 411/404 |
| 4,355,552 | * | 10/1982 | Gutshall ............................. | 81/460 |
| 4,464,957 | * | 8/1984 | Gill ...................................... | 81/460 |
| 4,998,454 | * | 3/1991 | Chaconas et al. .................. | 81/460 |
| 5,020,954 | * | 6/1991 | Dreger ................................ | 411/403 |
| 5,120,173 | * | 6/1992 | Grady ................................. | 411/404 |
| 5,641,258 | * | 6/1997 | Sala .................................... | 411/404 |

* cited by examiner

Primary Examiner—James G. Smith
Assistant Examiner—David B. Thomas
(74) Attorney, Agent, or Firm—Antonelli, Terry, Stout & Kraus, LLP

(57) ABSTRACT

A screw with a recessed head (3) has a crossing recess (4) formed in a top of the head and consisting of a central region (5) and four grooves (6) extending radially from the central region. Each groove is tapered to reduce width towards an outer conical bottom (9), which defines the groove together with opposite side walls (7, 8) transmitting torque. The bottom connecting outer edges of the side walls has a width 'A' larger than width 'a' in the widely used standard recesses of the same length 'M'. The side walls have a radial length 'B' smaller than 'A', and distance 'C' between the intersections of two side walls of different grooves is equal to or larger than the product of 1.5 and 'A'. One side wall (7) lies in a flat plane in parallel with the screw's axis, and is located forward in a tightening direction of the screw. The conical bottom (9) slanted 5° relative to the axis provides a conical sticking surface. The crossing recess simply modified will transmit a stronger torque and affording a larger sticking area resistant to a stronger thrust, when driven with a driver bit matching the recess and provided here.

10 Claims, 10 Drawing Sheets

SCREW WITH A RECESSED HEAD AND A DRIVER BIT ENGAGEABLE THEREWITH

BACKGROUND OF THE INVENTION

1. Field of the Invention

The present invention relates to a screw with a recessed head and also relates to a driver bit capable of engaging with the recessed head of the screw, wherein the head has a cruciform recess for receiving a torque from the driver bit.

2. Prior Art

Phillip's crossing recesses have been employed in many countries as the recesses to be formed in some types of screw heads, and now have spread worldwide. Those screws with such prior art recessed heads afford sure transmission of torque by virtue of their crossing recesses. The driver bits can fit in the recesses snugly and firmly, thereby improving operation efficiency in tightening or removing those screws.

It is however noted that there have arisen certain problems in cases wherein some quenched and hardened self-tapping screws or self-drilling screws had been involved. These screws usually require stronger thrust when tightened. The crossing recesses widely adopted have in general their bit-sticking regions that are disposed near the centers of said recesses, so that thrust is born merely with smaller areas. A strong bending moment produced from the tightening torque is thus imparted mainly to such a small area in each recessed head. Those heads of the exemplified screws have however so hard heads that the driver bits' recess-sticking portions have been abraded early and seriously, causing a less reliable sticking engagement of the driver bits with the recessed heads. There has been a further problem that motor-driven or otherwise automatic screw drivers have often encountered breakage and/or cam-out of their bits, due to an over-torque that in turn has been caused by inexpert operators.

In order to resolve the problems inherent in the prior art, some proposals have been made to employ sophisticated recesses in place of such simply crossing ones of the screw heads, with driver bits also being modified to match the sophisticated recesses. The proposed recesses in the screw heads are suited to transmit a higher torque (as disclosed for instance in the Japanese Patent Laying-Open Gazette No.3-292407, Japanese Patent Publication No. 737805 and the U.S. Pat. No. 5,020,954).

SUMMARY OF THE INVENTION

An object of the present invention that was made in view of the background discussed above is therefore to provide a screw with a recessed head and a driver bit therefor, such that a recess in the head is of a cruciform shape simply modified but nevertheless adapted to transmit a stronger torque and affording a larger sticking area resistant to a stronger thrusting stress.

In order to achieve this object, the crossing recess formed in a top of the screw head consists of a central region and four grooves extending radially from and continuing from said region to thereby surround it, such that each groove is tapered to reduce its width towards a conical bottom disposed in radial direction away from the central region. Each groove is defined with opposite side walls facing one another and transmitting torque and with the conical bottom, which connects outer edges of the side walls to each other. Width 'A' of the said conical bottom is made larger than the corresponding width 'a' of the conical bottom of each groove formed in the prior art widely-used standard crossing recesses of the same groove length 'M'. The crossing recess of the invention is characterized in that length (or depth) 'B' in radial direction of the side walls is made smaller than the width 'A'. Distance 'C' between inner edges each defined as the juncture of adjacent side walls respectively belonging to the adjacent grooves is at least the product of 1.5 and the width 'A'. The crossing recess is also characterized in that one of the side walls of each groove lies in a flat plane extending in parallel with an axis of the screw, with the one side wall being located forward with respect to a direction in which the screw will be tightened. The conical bottom of each groove is preferably slanted at an angle of about 5 degrees relative to the screw axis so as to provide a conical sticking surface.

Alternatively, the other side wall located rearward in the direction of tightening the screw may be slanted at an angle of about 10 degrees relative to the screw axis. Such other side walls will also form a flat sticking surface substituting the conical one, also achieving the same object set forth above.

The driver bit also provided herein has a tip end matching the central region of the crossing recess and four protrusions (viz., drive vanes) extending from an outer periphery of the tip end and matching the four grooves in the recess.

When tightening the screw of the invention, the driver bit specially designed herein to match the screw has to be used. However, when loosening for the purpose of maintenance or disassembly, any conventional cruciform or square-columnar driver bit may also be used instead of that provided herein.

THE PREFERRED EMBODIMENTS

Figure 1:
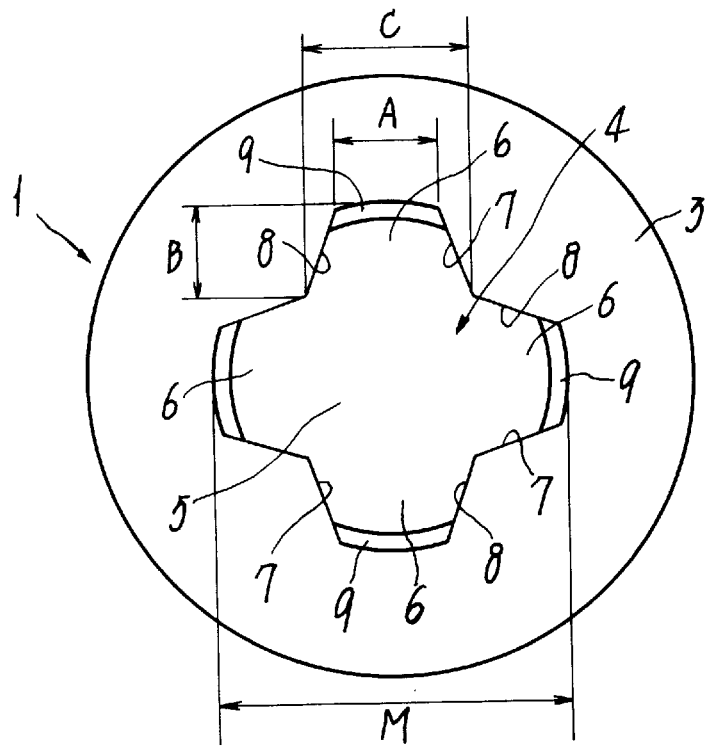
FIG. 1 is a plan view of a screw with a recessed head having a recess formed therein in accordance with the present invention.

Some preferable embodiments of the present invention will now be described referring to the drawings.

Figure 2:
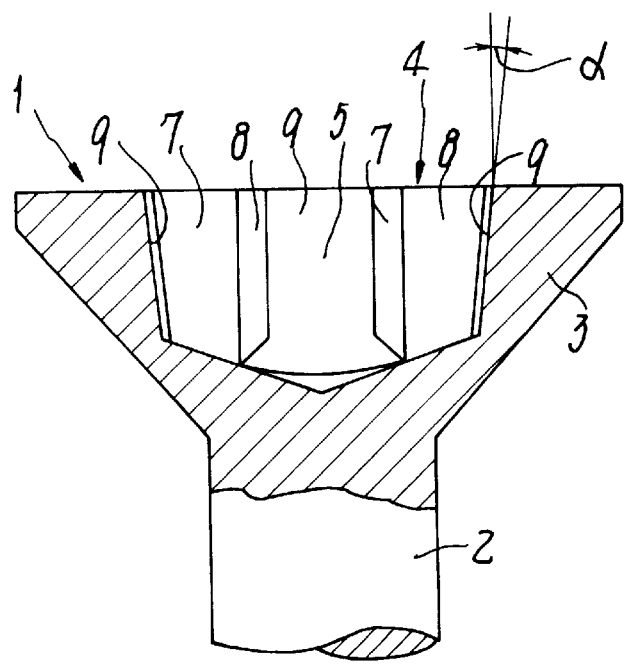
FIG. 2 is a fragmentary front elevation of the screw, partially shown in vertical cross section.
Figure 5:
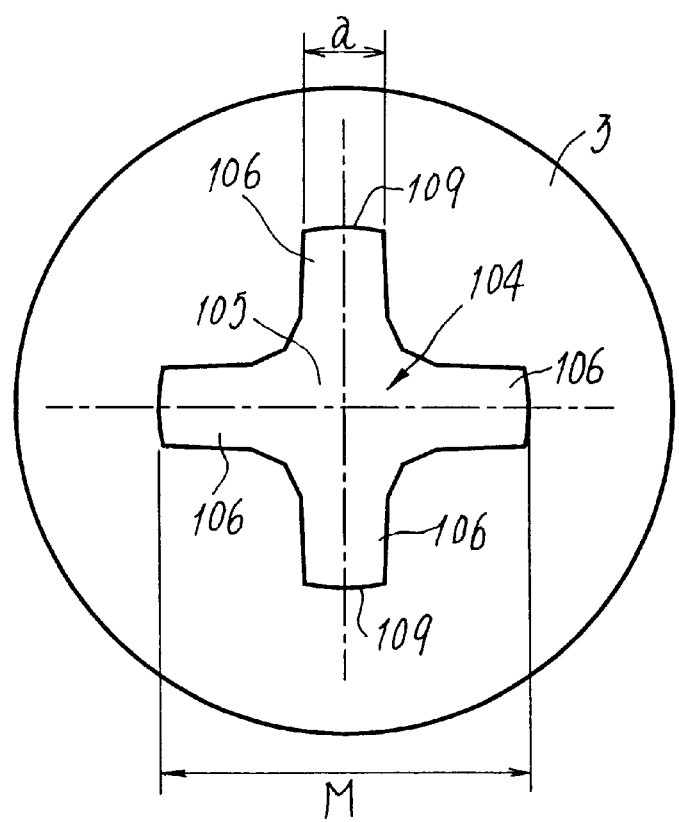
FIG. 5 is a plan view of the prior art screw whose head has a conventional crossing recess formed therein.

FIGS. 1 and 2 show a screw 1 with a recessed head formed in accordance with the present invention. The head 3 on the top of a shank 2 has a top face in which carved is a crossing recess 4 of a configuration specified herein. The crossing recess 4 consists of a central region 5 from which four grooves 6 extend radially and outwardly at regular angular intervals of 90 degrees. Each groove 6 is defined between opposite side walls 7 and 8 and a conical bottom 9 that is disposed in radial direction away from the center region. The conical bottom 9 connects the side walls to each other, which walls will serve to transmit torque. These features almost coincide with those which are inherent in the prior art screws of a conventional standard type each with a crossing recess 104 for wide use as exemplified in FIG. 5. The screw provided herein is however characteristic as will be detailed below, if compared with the prior art screws that have the same length 'M' of the crossing recess 104 as the present screw and each consist of a central region 105 and grooves 106.

Width 'A' of the conical bottom 9 of each groove 6 included in the crossing recess 4 is made larger than width 'a' of the corresponding conical bottom 109 of each groove 106 formed in the prior art conventional and standard crossing recess 104. Length (or depth) 'B' in radial direction of he side walls of each groove in the present invention 6 is made smaller than he width 'A'. Distance 'C' between inner edges each defined as the juncture of adjacent side walls 7 and 8 that belong to the adjacent grooves 6 is the product of width 'A' and 1.5 or more. Thus, width between facing portions of the steeply slanted side walls 7 and 8 increases not gently but rather in a sudden fashion towards the central region 5. Consequently, the central region 5 in the present invention is much larger than those 105 which the prior art crossing recesses 104 for wide use have.

Figure 6B:
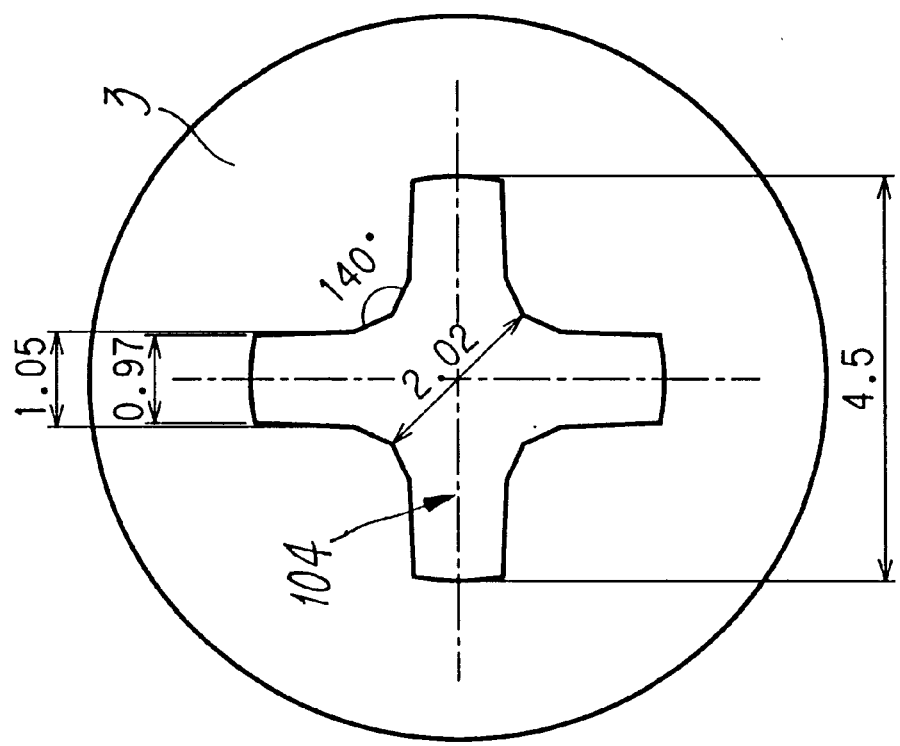
FIG. 6b is a plan view of the prior art screw having a conventional crossing recess, shown for comparison with that of the invention.
Figure 6A:
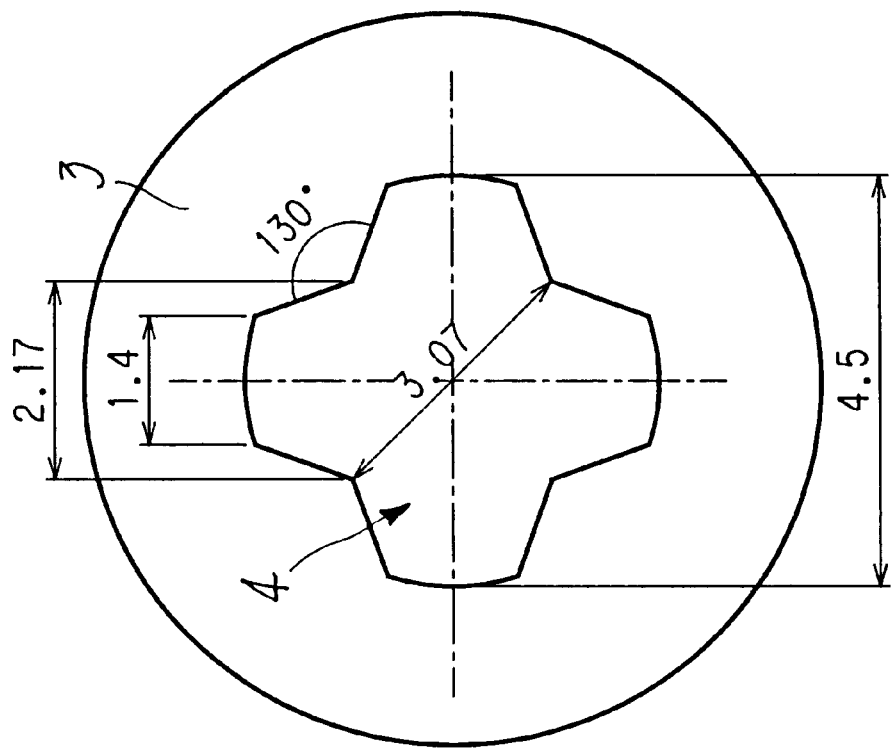
FIG. 6a is a plan view of the present screw having the crossing recess of the invention.

As will be seen in FIGS. 6a and 6b, there is an apparent difference observed in shape and size between the present crossing recess 4 (in FIG. 6a) and the prior art one 104 (in FIG. 6b). Both the recesses are for the same length 'M' being 4.5 mm, with the prior art recess 104 being prescribed in the Japanese Industrial Standards (viz., JIS) and intended for wide use.

At least one of the side walls 7 of each groove 6 lies in a flat plane extending in parallel with an axis of the screw having the crossing recess 4 of the present invention. In use, the one side wall 7 will bear against the driver bit tightening the screw. In the screw 1 shown in FIGS. 1 and 2, the other side wall 8 which will in use bear against the bit loosening said screw does likewise lie in another plane extending in parallel with an axis of the screw. On the other hand, each groove's conical bottom 9 whose center line is aligned with the screw axis is slanted at an angle ($\alpha$)(see FIG. 2) of about 5°, more preferably 5° 46' relative thereto so as to provide a conical sticking surface.

Figure 3:
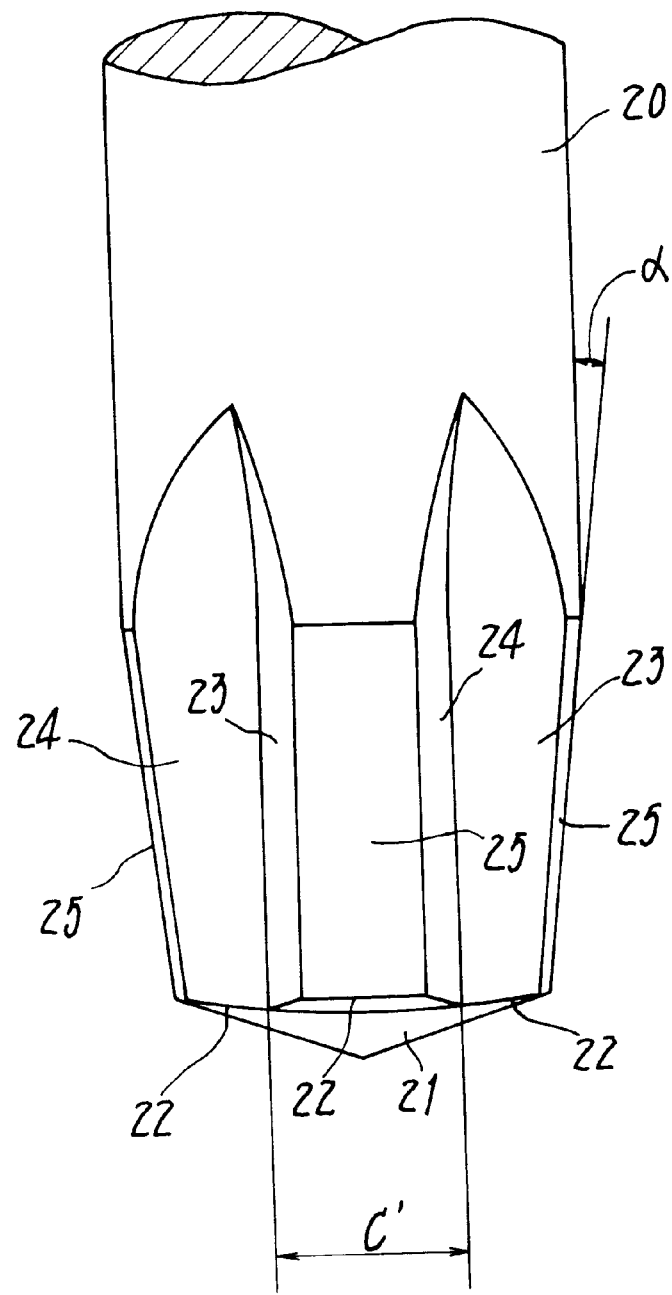
FIG. 3 is a fragmentary front elevation of a driver bit for use to tighten the screw.

A driver bit 20 provided herein and shown in FIG. 3 is designed for particular use to tighten the screw 1 by fitting in the crossing recess 4 thereof. The bit has a tip end 21 of a shape matching the central region 5 of the recess and four ridges (i.e., drive vanes) 22 formed integral with an outer periphery of the tip end. Each ridge engaging with any of the four grooves 6 has opposite side faces 23,24 that are inclined at substantially the same angle as the slanted side walls 7,8 of each groove. An outer face 25 of each ridge 22 is a part of a conical surface slanted at the same angle $\alpha$ as those of the conical bottoms 9 of the grooves 6. Width C' between opposite roots of each ridge 22 is made larger than width of the outer face, in harmony with the distance C measured between the inner edges of each groove.

Figure 4:
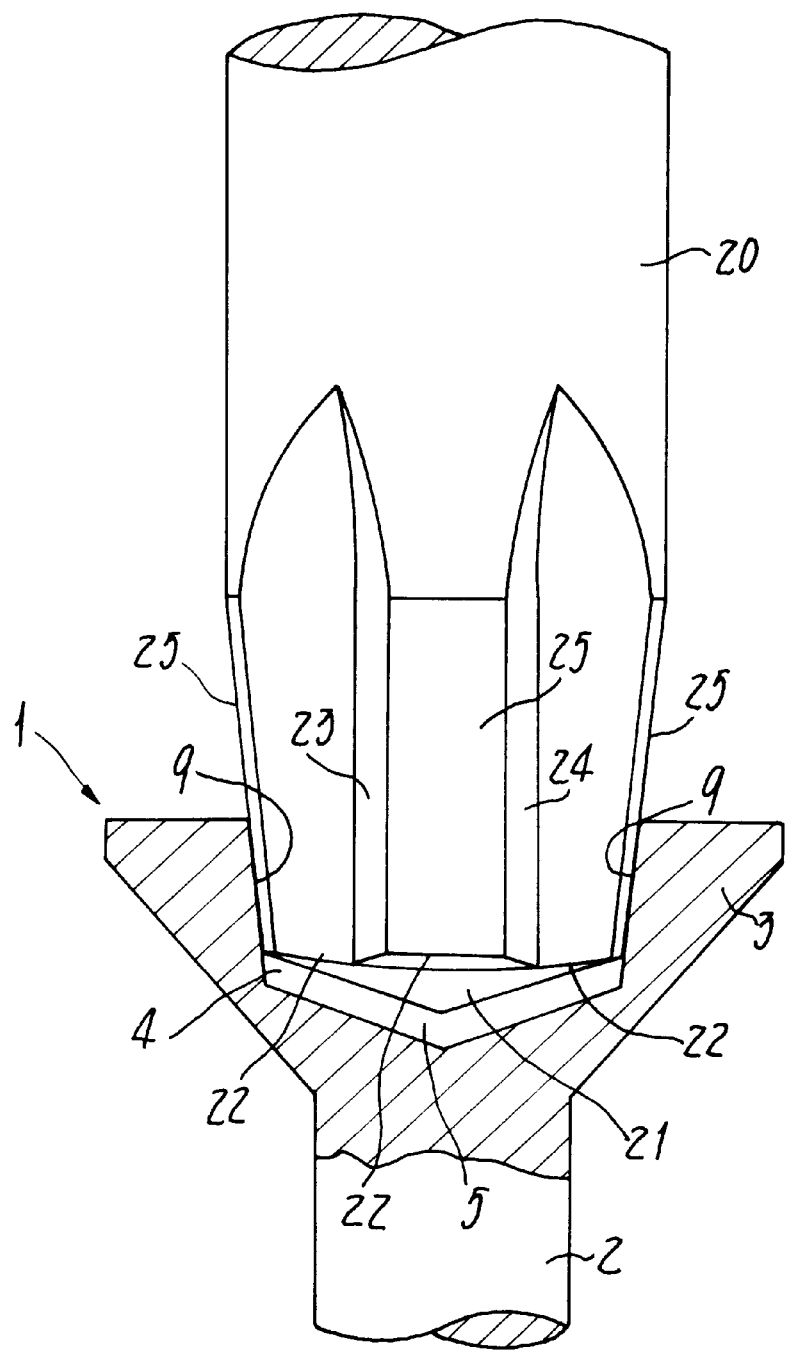
FIG. 4 is a fragmentary front elevation of the driver bit engaging with the crossing recess in the screw shown partially in vertical cross section.

FIG. 4 show the driver bit 20 fitted in the crossing recess 4 so as to tighten the screw 1. The conical bottom 9 of the recess's grooves 6 are the parts of a conical surface having its center line aligned with the axis of the screw. Likewise, the outer faces 25 of driver bit's ridges (viz., drive vanes) 22 are parts of substantially the same conical surface also having its axis aligned with the axis of bit 20. Therefore, even if any small clearance is allotted to between the side face 23 or 24 of each ridge 22 and the side wall 7 or 8 of each groove 6, all the ridges 22 will slide along the respective conical bottoms 9 in a circular direction. The outer faces 25 are thus kept in good contact with the broad conical bottoms of the grooves 6. A broad sticking area will thus be ensured for the bit and recess so as to withstand well a high thrust. At the same time, the four ridges (viz., drive vanes) 22 of the bit then tightening the screw have their 'forward' side faces 23 abutting against the 'rearward' side walls 7 of the recessed grooves 6 in the screw being tightened. The words 'forward' and 'rearward' denote locations in a direction of tightening the screw. Those side walls 7 lying in a plane in parallel with the screw axis will thus receive and transmit a strong torque, almost without any loss of force and without any fear of causing the so-called 'cam-out' of the driver bit 20.

If and when the screw 1 thus tightened is loosened and removed, the specially designed driver bit 20 of the invention may preferably be used, but not excluding use of any other standard and conventional one of a cruciform shape or the like.

Figure 7:
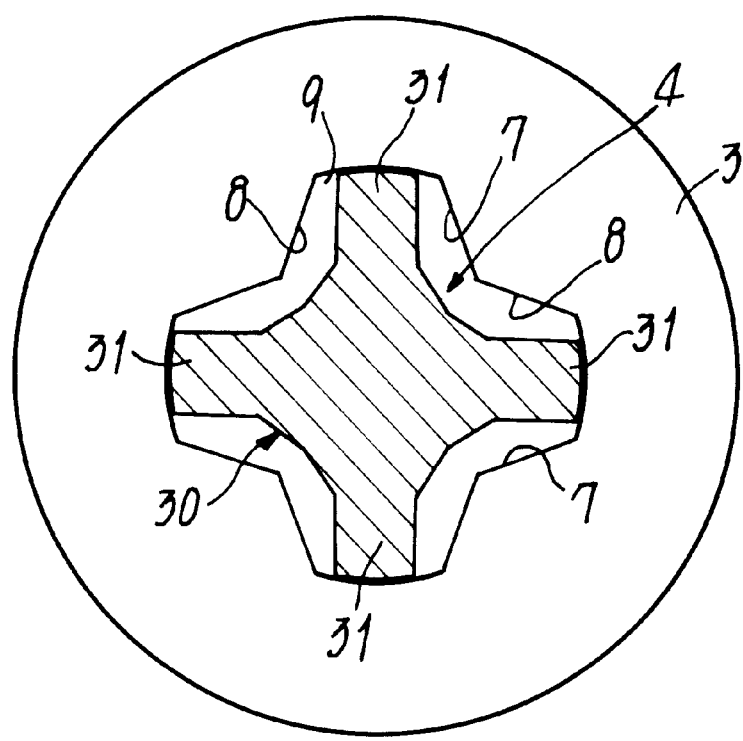
FIG. 7 is a plan view of the present screw having the crossing recess and being loosened with use of the prior art driver bit having a conventional cruciform driver bit that is shown in horizontal cross section.
Figure 8:
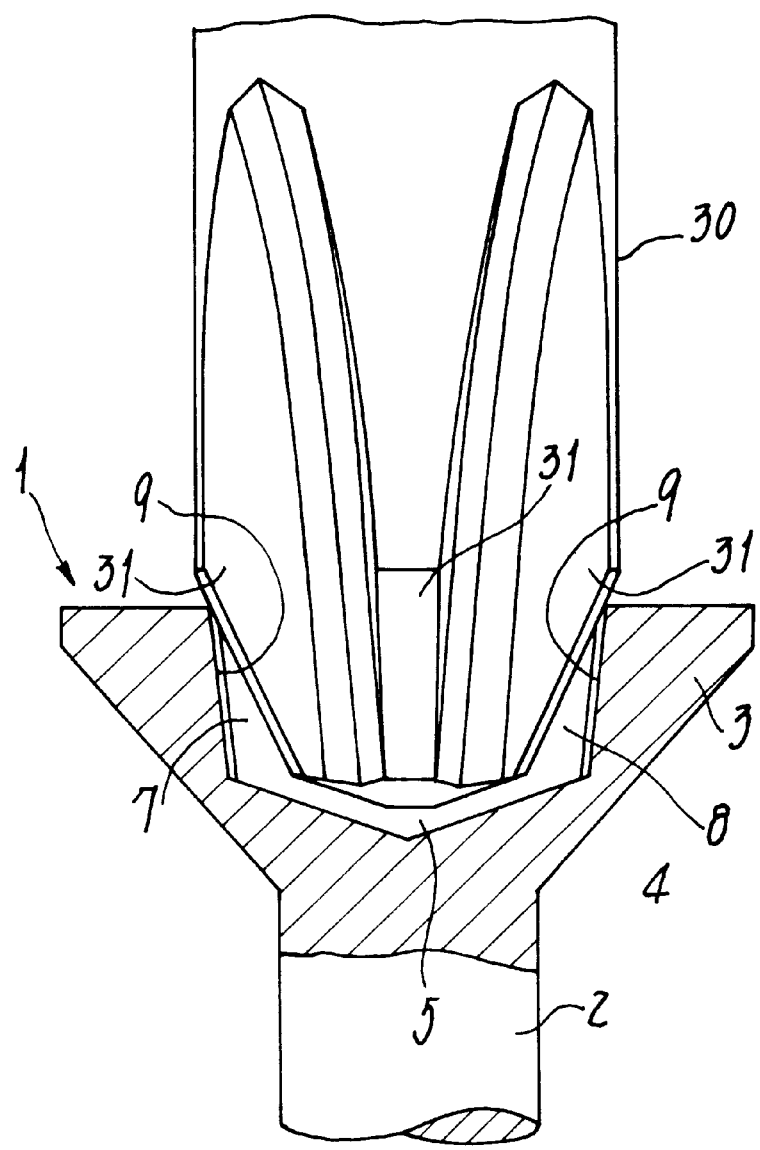
FIG. 8 is a front elevation corresponding to FIG. 7, but the screw shown partially in vertical cross section.

FIGS. 7 and 8 show a widely-used cruciform bit 30 fitted in the crossing recess 4 of the screw 1. The four ridges (or drive vanes) 31 of this bit are so thin that noticeable interstices appear between them and the grooves' opposite side walls 7 and 8. With the cruciform bit 30 being driven to spin to loose the screw 1, the outer end of each ridge 31 will however come into contact with the side wall 8 that is then located 'forward' in a direction in which the screw is being loosened. Since torque necessitated to loosen screws is weaker than that for tightening same, those conventional driver bits such as 30 can withstand the loosening torque.

Figure 9:
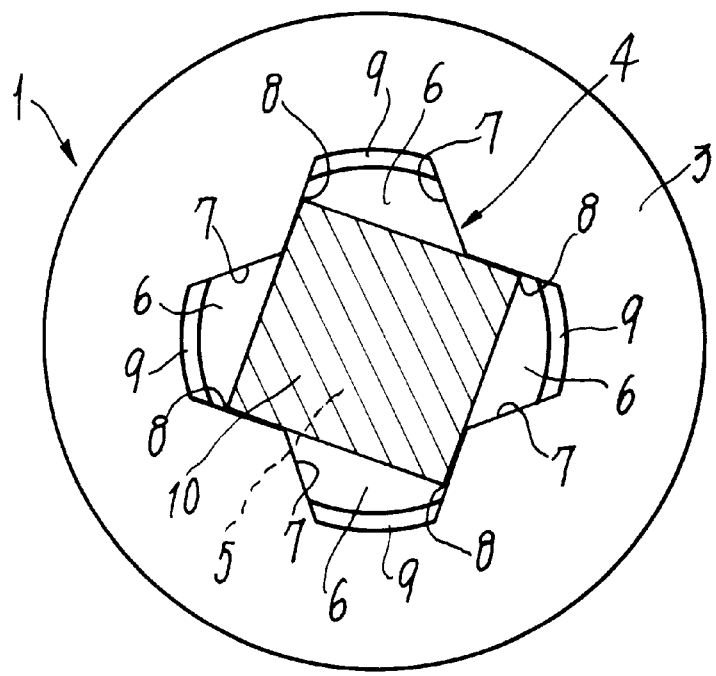
FIG. 9 is a plan view of the present screw having the crossing recess and being loosened with use of the prior art driver bit having a conventional square-columnar driver bit that is shown in horizontal cross section.

FIG. 9 illustrates a widely-used square-columnar bit 40 fitted in the crossing recess of the screw 1. This recess 4 has the central region 5 that is large enough for fitting on the columnar bit of a sufficient dimension to transmit a torque required to loosen the screw.

Figure 10:
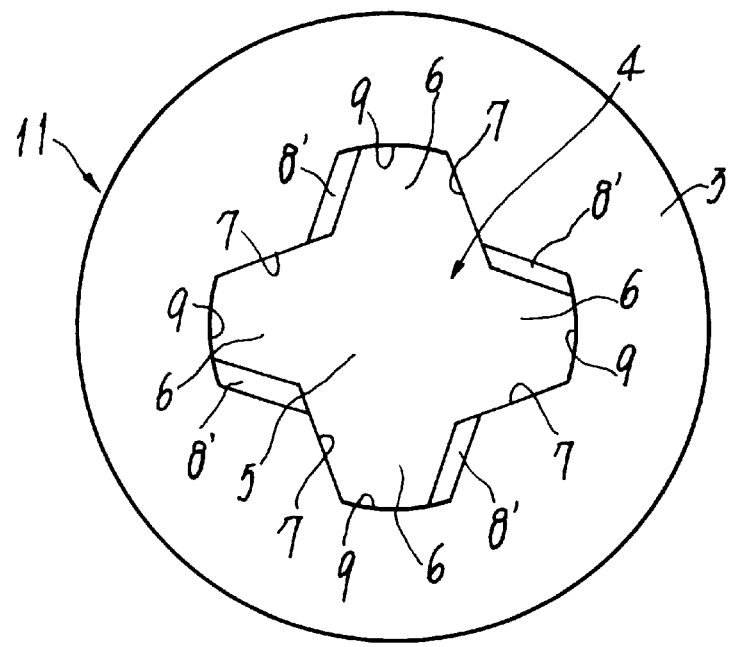
FIG. 10 is a plan view of a screw with a recessed head having a recess formed in a further embodiment of the invention.
Figure 11:
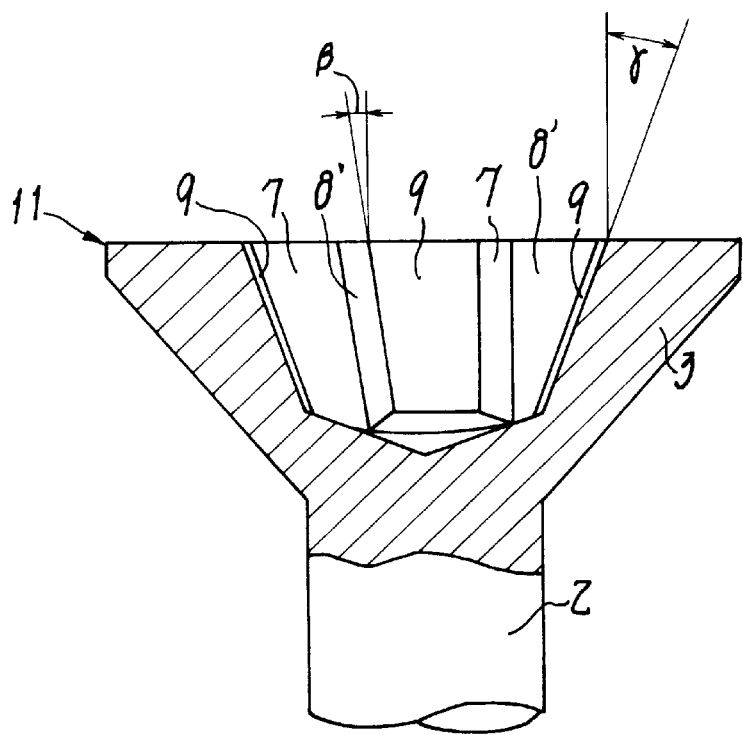
FIG. 11 is a fragmentary front elevation of the screw of FIG. 10, partially shown in vertical cross section.

FIGS. 10 and 11 show a modified screw 11 provided herein to have a different recess. This screw 11 is basically of the same structure as that 1 shown in FIGS. 1 and 2, so that description of the same or similar parts denoted with the same reference numerals will not be repeated. A 'forward' side wall 8' will lead the other side wall of each groove 6 in a direction in which the screw is loosened. Such forward side walls are intended in this case to function as the sticking surfaces, instead of the conical sticking surfaces or bottoms 9 in the screw's 1 grooves 6 in the preceding embodiment.

In detail, the 'forward' side walls 8' of the grooves 6 are inclined at an angle ($\beta$) of about 10 degrees with respect to the screw axis, to thereby provide flat sticking surfaces. A conical bottom 9' of each groove in this case is designed oblique by an angle ($\gamma$) of about 15 to 20 degrees relative to said screw axis. Those conical bottoms 9' will guide a driver bit 20' to smoothly fit into the recess.

Figure 12:
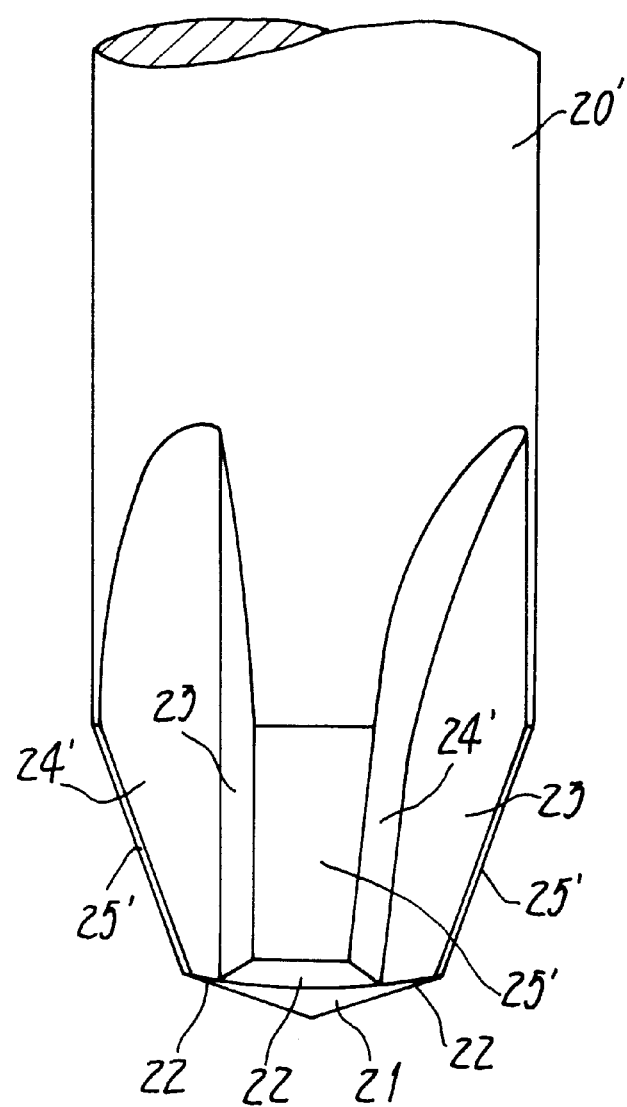
FIG. 12 is a fragmentary front elevation of a driver bit provided herein for use with the screw in the further embodiment.

FIG. 12 shows the special driver bit 20' for use to tighten the screw 11, by engaging with a recess 4 thereof. The driver bit 20' is basically of the same structure as that 20 shown in FIG. 3, so that description of the same or similar parts denoted with the same reference numerals will not be repeated again.

Also in this driver bit 20', the 'forward' side faces 24' of the four ridges (i.e., drive vanes) 22 are inclined at an angle (β) of about 10 degrees with respect to the screw axis, in harmony with the side walls 8' of the screw 11. Each ridge's outer face 25' in this case is designed oblique by an angle (γ) of about 15 to 20 degrees relative to an axis of the driver bit 20'.

Therefore, with the driver bit 20' being fitted in the crossing recess 4 to tighten the screw 11, the slanted side faces 24' of four ridges 22 will be kept in good contact with the grooves 6 at their slanted side walls 8' located ahead in the loosening direction. A broad sticking area will thus be ensured for the bit and recess so as to withstand well a high thrust. At the same time, the four ridges (viz., drive vanes) 22 of the bit then tightening the screw have their 'forward' side faces 23 will abut against the 'rearward' side walls 7 of the recessed grooves 6 in the screw being tightened. The words 'forward' and 'rearward' denote locations in a direction of tightening the screw. Those side walls 7 lying in a plane in parallel with the screw axis will thus receive and transmit a strong torque, almost without any loss of force and without any fear of causing the so-called 'cam-out' of the driver bit 20'.

If and when the screw 11 thus tightened is loosened and removed, the specially designed driver bit 20' of the invention may preferably be used as in the case of the screw 1 described at first hereinbefore, but not excluding use of any other standard and conventional one of a cruciform shape 30, a square-columnar shape 40 or the like.

In summary, each of the four grooves in the recessed head of the invented screw is shallower and has an increased overall width as compared with those in the standard wide-use crossing recesses. More particularly, the distance or width between inner edges each defined as the juncture of adjacent side walls respectively belonging to the adjacent grooves is made much larger than that in the prior art. By virtue of this feature, the driver bit provided herein to engage with those invented recesses has such thicker ridges (viz., drive vanes) as able to transmit and withstand a higher torque accompanied by a stronger thrusting stress. One of the opposite side walls, which is located forwardly of the tightening direction, does lie in a flat plane in parallel with the screw axis, so that such a high torque transmitted will never causes the problem of 'cam-out' to the driver bit.

Also in the invention, the conical bottoms of the four grooves, or the rearward side walls thereof in the sense of tightening direction, are intended to serve as a whole an integrated sticking area. This area is much wider than that in the prior art crossing recesses whose sticking areas are each located at or near the central region of the recess. Thus, the driver bit can more surely 'stick' to the recesses of the present invention. In one aspect defined in the accompanying claim 1, the conical bottoms form the sticking area, and a small clearance may be allowed between the side face of each ridge and the side wall of each groove. Such a clearance will never work adversely, because all the ridges will slide along the respective conical bottoms in a circular direction in order to ensure a satisfactory sticking effect.

On the other hand, not only the special driver bit of the invention but also any prior art one for the crossing recesses may be used to loosen or remove the screws that have been tightened. The wider central region of the invented recess will allow use of a square-columnar wrench for loosening the invented screws, thus improving usefulness thereof.

What is claimed is:

1. A screw with a recessed head: the screw comprising a crossing recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein width 'A' of the conical bottom is larger than width 'a' of the corresponding conical bottom of each groove formed in crossing recesses of the same length 'M' prescibed in Japanese Industrial Standars, length 'B' in radial direction of the side walls is smaller than the width 'A', and a distance 'C' between inner edges each defined as the juncture of adjacent side walls respectively belonging to the adjacent grooves is at least the product of 1.5 and the width 'A', wherein one of the side walls of each groove lies in a flat plane extending in parallel with an axis of the screw, with the one side wall being located forward with respect to a tightening direction of the screw, and wherein the conical bottom of each groove is slanted at about 5° relative to the axis so as to provide a conical sticking surface.

2. A driver bit comprising: a tip end matching a central region of a crossing recess formed in a top of a head of a screw, the screw comprising a cross recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein width 'A' of the conical bottom is larger than width 'a' of the corresponding conical bottom of each groove formed in crossing recess of the same length 'M' prescribed in Japanese Industrial Standards, length 'B' in radial direction of the side walls is smaller than the width 'A' and a distance 'C', between inner edges each defined as the juncture of adjacent side walls respectively belonging to the adjacent grooves is at least the product of 1.5 and the width 'A', wherein one of the side walls of each groove lies in a flat plane extending in parallel with an axis of the screw, with the one side wall being located forward with respect to a tightening direction of the screw, and wherein the conical bottom of each groove is slanted at about 5° relative to the axis so as to provide a conical sticking surface, and the driver bit further comprising four protrusions extending from an outer periphery of the tip end and matching the four grooves.

3. A screw with a recessed head: the screw comprising a crossing recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein width 'A' of the conical bottom is larger than width 'a' of the corresponding conical bottom of each groove formed in crossing recesses of the same length 'M' prescribed in Japanese Industrial Standards, length 'B' in radial direction of the side walls is smaller than the width 'A', and a distance 'C' between inner edges each defined as the juncture of adjacent side walls respectively belonging to the adjacent grooves is at least the product of 1.5 and the width 'A', wherein one of the side walls of each groove lies in a flat plane extending in parallel with an axis of the screw, with the one side wall being located forward with respect to a tightening direction of the screw, and wherein the other side wall located rearward with respect to the tightening direction lies in a further flat plane extending in parallel with the axis, with the further flat plane being slanted at about 10° relative to the axis so as to provide a flat sticking surface.

4. A driver bit comprising: a tip end matching a central region of a crossing recess formed in a top of a head of a screw, the screw comprising a crossing recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein width 'A' of the conical bottom is larger than width 'a' of the corresponding conical bottom of each groove formed in crossing recesses of the same length 'M' prescribed in Japanese Industrial Standards, length 'B' in radial direction of the side walls is smaller than the width 'A', and a distance 'C' between inner edges each defined as the juncture of adjacent side walls respectively belonging to the adjacent grooves is at lease the product of 1.5 and the width 'A', wherein one of the side walls of each groove lies in a flat plane extending in parallel with an axis of the screw, with the one side wall being located forward with respect to a tightening direction of the screw, and wherein the other side wall located rearward with respect to the tightening direction lies in a further flat plane extending in parallel with the axis, with the further flat plane being slanted at about 10° relative to the axis so as to provide a flat sticking surface, and the driver bit further comprising four protrusions extending from an outer periphery of the tip end and matching the four grooves.

5. A combination comprising a screw with a recessed head, the screw comprising a crossing recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein width 'A' of the conical bottom is larger than width 'a' of the corresponding conical bottom of each groove formed in crossing recesses of the same length 'M' prescribed in Japanese Industrial Standards, length 'B' in radial direction of the side walls is smaller than the width 'A', and a distance 'C' between inner edges each defined as the juncture of adjacent side walls respectively belonging to the adjacent grooves is at lease the product of 1.5 and the width 'A' wherein one of the side walls of each groove lies in a flat plane extending in parallel with an axis of the screw, with the one side wall being located forward with respect to a tightening direction of the screw, and wherein the other side wall located rearward with respect to the tightening direction lies in a further flat plane extending in parallel with the axis, with the further flat plane being slanted at about 10° relative to the axis so as to provide a flat sticking surface, and a driver bit having a tip end matching the central region of the crossing recess of the screw and four protrusions extending from an outer periphery of the top end and matching the four grooves.

6. A combination comprising a screw with a recessed head, the screw comprising a cross recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein width 'A' of the conical bottom is larger than width 'a' of the corresponding conical bottom of each groove formed in crossing recess of the same length 'M' prescribed in Japanese Industrial Standards, length 'B' in radial direction of the side walls is smaller than the width 'A', and a distance 'C' between inner edges each defined as the juncture of adjacent side walls respectively belonging to the adjacent grooves is at least the product of 1.5 and the width 'A', wherein one of the side walls of each groove lies in a flat plane extending in parallel with an axis of the screw with the one side wall being located forward with respect to a tightening direction of the screw, and wherein the conical bottom of each groove is slanted at about 5° relative to the axis so as to provide a conical sticking surface, and a driver bit having a tip end matching the central region of the crossing recess of the screw and four protrusions extending from an outer periphery of the tip end and matching the four grooves.

7. A screw with a recessed head: the screw comprising a crossing recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein a length 'B' in a radial direction of the side walls is smaller than a width 'A' of the conical bottom, and a distance 'C' between inner edges each defined as the juncture of adjacent side walls respectively belonging to the adjacent grooves is at least the product of 1.5 and the width 'A';

wherein one of the side walls of each groove lies in a flat plane extending in parallel with an axis of the screw, with the one side wall being located forward with respect to a tightening direction of the screw, and wherein the conical bottom of each groove is slanted at about 5° relative to the axis so as to provide a conical sticking surface.

8. A screw with a recessed head: the screw comprising a crossing recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein a length 'B' in a radial direction of the side walls is smaller than a width 'A' of the conical bottom, and a distance 'C' between inner edges each defined as the juncture of adjacent side walls respectively belonging to the adjacent grooves is at least the product of 1.5 and the width 'A';

wherein one of the side walls of each groove lies in a flat plane extending in parallel with an axis of the screw, with the one side wall being located forward with respect to a tightening direction of the screw, and wherein the other side wall located rearward with respect to the tightening direction lies in a further flat plane extending in parallel with the axis, with the further flat plane being slanted at about 10° relative to the axis so as to provide a flat sticking surface.

9. A driver bit comprising: a tip end matching a central region of a crossing recess formed in a top of a head of a screw, the screw comprising a crossing recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein a length 'B' in a radial direction of the side walls is smaller than a width 'A' of the conical bottom, and a distance 'C' between inner edges each defined as the juncture of adjacent side walls respectively belonging to the adjacent grooves is at least the product of 1.5 and the width 'A';

wherein one of the side walls of each groove lies in a flat plane extending in parallel with an axis of the screw, with the one side wall being located forward with respect to a tightening direction of the screw, and wherein the conical bottom of each groove is slanted at about 5° relative to the axis so as to provide a conical sticking surface, and the driver bit further comprising four protrusions extending from an outer periphery of the top end and matching the four grooves.

10. A driver bit comprising: a tip end matching a central region of a crossing recess formed in a top of a head of a screw, the screw comprising a crossing recess formed in a top of the head, the recess consisting of a central region and four grooves extending radially therefrom, each groove being tapered to reduce width towards a conical bottom thereof disposed in radial direction away from the central region, and each groove being defined with opposite side walls facing one another and transmitting torque and with the conical bottom that connects outer edges of the side walls to each other, wherein a length 'B' in radial direction of the side walls is smaller than a width 'A' of the conical bottom, and a distance 'C' between inner edges each defined as the juncture of adjacent side walls respectively belonging to the adjacent grooves is at least the product of 1.5 and the width 'A';

wherein one of the side walls of each groove lies in a flat plane extending in parallel with an axis of the screw, with the one side wall being located forward with respect to a tightening direction of the screw, and wherein the other side wall located rearward with respect to the tightening direction lies in a further flat plane extending in parallel with the axis, with the further flat plane being slanted at about 10° relative to the axis so as to provide a flat sticking surface, and the driver bit further comprising four protrusions extending from an outer periphery of the top end and matching the four grooves.

* * * * *